United States Patent [19]

Carrier

[11] 4,068,342
[45] Jan. 17, 1978

[54] CASTER SUPPORT STRUCTURE

[76] Inventor: Vernon J. Carrier, 25830 Viana St., Lomita, Calif. 90717

[21] Appl. No.: 707,842

[22] Filed: July 22, 1976

[51] Int. Cl.$^2$ ............................................. B60B 33/00
[52] U.S. Cl. ............................................ 16/21; 16/38; 16/43; 16/DIG. 27; 308/230
[58] Field of Search ............ 16/21, 37, 38, 39, 43, 16/18 CG; 308/230

[56] References Cited

U.S. PATENT DOCUMENTS

| 803,682 | 11/1905 | Fishburne | 16/21 |
|---|---|---|---|
| 1,879,429 | 9/1932 | Noelting et al. | 16/21 |
| 2,542,218 | 2/1951 | Toelstede | 308/230 |
| 2,992,449 | 7/1961 | Haydock | 16/43 |
| 3,088,600 | 5/1963 | Clensy | 308/230 |
| 3,128,495 | 4/1964 | Tooth | 16/38 |
| 3,210,795 | 10/1965 | Fontana et al. | 16/43 |

*Primary Examiner*—Werner H. Schroeder
*Assistant Examiner*—Conrad L. Berman
*Attorney, Agent, or Firm*—Edward D. O'Brian

[57] ABSTRACT

An effective, relatively inexpensive, improved caster support structure can be manufactured by molding an appropriate polymer, preferably polypropylene, around a retainer forming a part of a conventional bearing into the shape of a housing. The housing is preferably shaped so as to include an elongated first cylinder which is coaxial with a second cylinder of greater diameter than the first. The bearing is located within a cavity at the end of a second cylinder remote from the first cylinder and is held in place because the portion of the retainer adjacent to the end of the second cylinder remote from the first is of smaller diameter than at least another portion of the retainer. The retainer is held against movement in such a way that it cannot be displaced by the shape of the retainer and housing and by a compressive type force resulting from a polymer orientation. The internal structure of a polymer necessary to exert this force is developed within the polymer as a result of cooling of the polymer material from a temperature at which it will flow during molding to ambient temperature.

2 Claims, 3 Drawing Figures

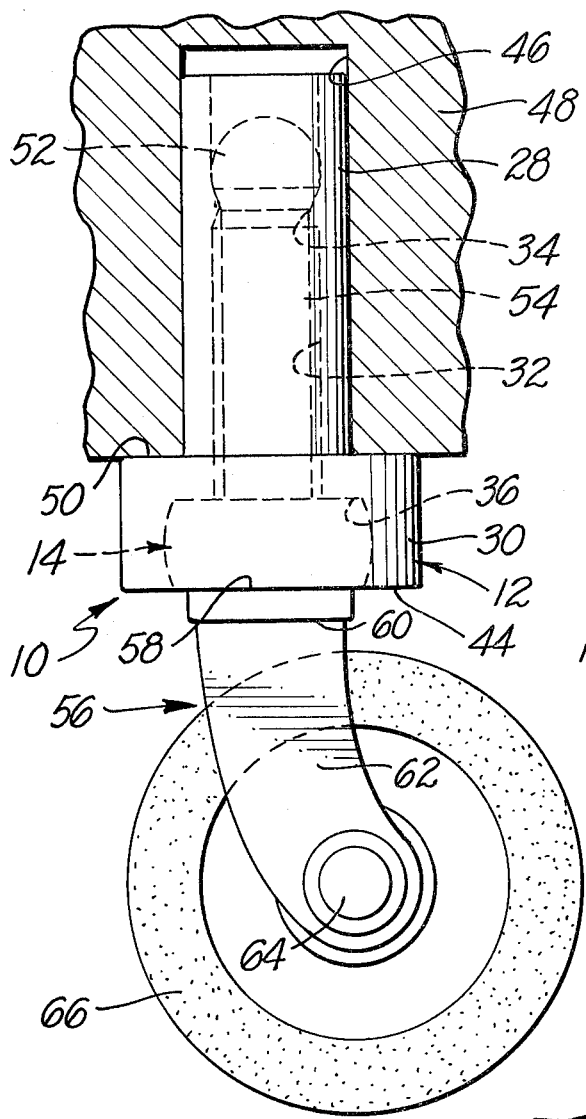
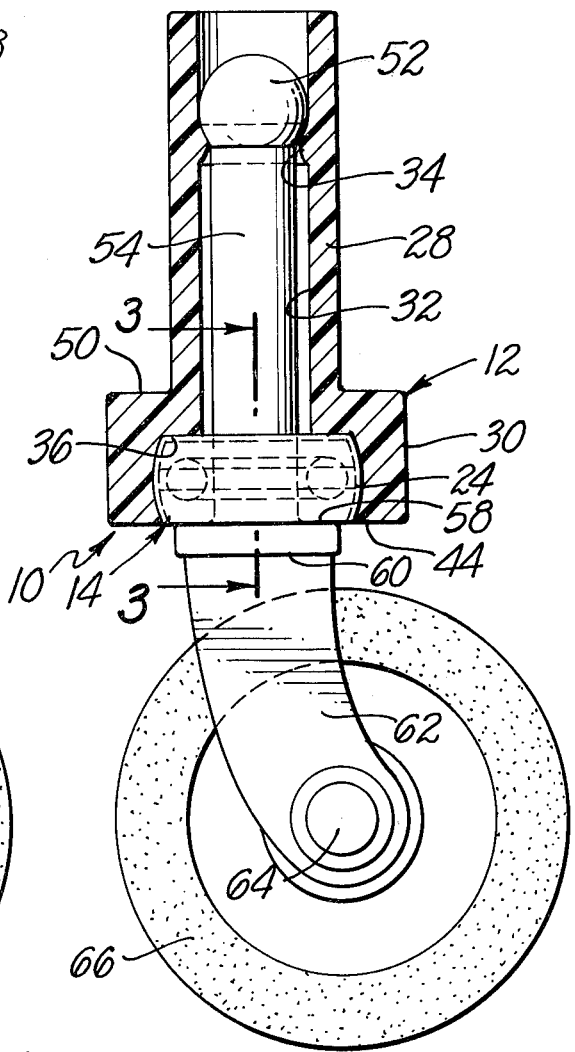
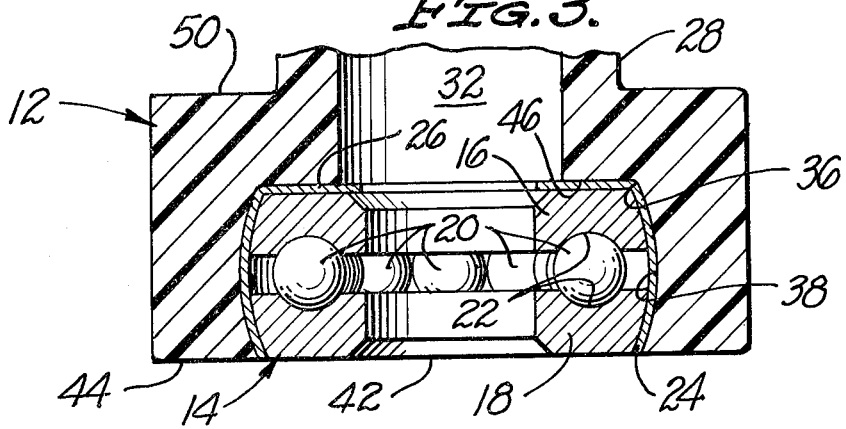

CASTER SUPPORT STRUCTURE

BACKGROUND OF THE INVENTION

The invention set forth herein pertains to new and improved caster support structures. Such support structures may be regarded as, in effect, forming a part of a caster.

Technically, a caster may be regarded as a structure involving a small wheel mounted upon a swivel which is utilized under an object so as to facilitate movement of the object. The invention set forth in this specification is primarily concerned with casters which have a yoke serving to support a wheel on an axle extending between the ends of the arms of the yoke and having a mounting shaft extending from the base of the yoke.

Casters of this type are normally utilized by placing the shaft in a support or support structure attached to and/or carried by an object so that the base of he yoke rests upon an end of the support or support structure with the shaft on the caster extending upwardly into a cylindrical cavity in the support or support structure. Most commonly such shafts are provided with headed ends remote from the yokes to which they are attached and most commonly the support or support structures include a somewhat resilient retainer permitting the shaft to be inserted into the support or support structure so that the head on such a shaft "snaps" or "pops" past the retainer into an operative position.

A structure of this type will operate as a caster as a result of relative rotation of the base of the yoke against the ends of the support or support structure and as a result of the shaft fitting within the support or support structure so as to be capable of rotating relative to it. Such a shaft is employed primarily in order to prevent twisting or "cocking" about the axis of the shaft since such twisting or "cocking" would tend to interfere with the desired swivel action and/or rotation of the wheel about the axis of the shaft. Frequently the degree of friction between the base of a yoke of a caster and the support or support structure will be sufficiently great so as to impede such rotation about the axis of the shaft employed.

As a result of this, it is conventional to utilize bearings such as roller bearings so that they are generally disposed between a yoke and a support or support member. It is considered disadvantageous to utilize such a bearing so that it is mounted directly upon a shaft and/or yoke since if a normally exposed part of a caster were to become damaged there would be danger of the bearing having to be replaced. In the past it is believed that it has been proposed to mount bearings used for the purpose described directly upon supports or support structures. It is considered that such efforts have been unsatisfactory because of difficulty in adequately and firmly mounting bearings in such supports or support structures.

BRIEF SUMMARY OF THE INVENTION

An objective of the present invention is to provide new and improved supports or support structures containing bearings for use in conjunction with casters. Further objectives of the invention are to provide supports or support structures for the purpose indicated which can be manufactured easily and conveniently at a comparatively nominal cost, which may be easily installed in an operative manner, which need not be replaced if various caster parts have to be replaced, and which are effective for their intended utilization.

In accordance with this invention, these and various other objectives are acheived by providing a caster support structure which comprises: a housing and a bearing, the housing being a unitary body shaped to include first and second axially aligned cylinders located in an end to end relationship, the first cylinder being of smaller diameter than the second and having an internal annular retaining bead extending into its interior, the second cylinder having an internal cavity in the end thereof remote from the first cylinder, this cavity being symmetrically located about the axis and a peripheral wall connecting these sides, one of these sides being open to the end of the second cylinder remote from the first, the bearing having an external retainer fitting within and being engaged by the peripheral wall so as to secure the bearing in place in a position in which a movable part of the bearing is exposed to the end of the second cylinder remote from the first.

BRIEF DESCRIPTION OF THE DRAWING

Further details of the invention are best indicated with reference to the accompanying drawing in which:

FIG. 1 is a side elevational view of a presently preferred embodiment of a caster support structure of this invention in use with a caster located "upon" an object, this object being indicated in section;

FIG. 2 is a view corresponding to FIG. 1 of the caster and caster support structure illustrated in FIG. 1 with the housing of the caster support being shown in section and the remainder of the parts illustrated being shown in elevation; and FIG. 3 is a cross-sectional view at an enlarged scale taken at line 3—3 of FIG. 2.

The caster support structure illustrated in the drawing embodies certain concepts or principles as are set forth and defined in the appended claims. These concepts and principles can be utilized in somewhat differently appearing and differently constructed structures through the use or exercise of routine engineering skill.

DETAILED DESCRIPTION

In the drawing, there is shown a caster support structure 10 which includes a unitary polymer housing 12. This housing 12 is preferably formed out of a physically strong polymer material of a somewhat resilient character which is capable of being reasonably utilized as a bearing material because of its coefficient of friction. A particularly suitable material is common polypropylene such as is utilized for the molding of many different types of parts. This material is considered to be particularly desirable because it possesses the note properties and because it shrinks on cooling after being injection molded. The importance of the latter is best explained by referring to how the housing 12 is manufactured.

Such manufacture includes the use of a bearing 14 having ball races 16 and 18 separated by balls 20 extending into grooves 22 in these races 16 and 18 and having a generally barrel shaped retainer 24 extending around the exteriors of these races 16 and 18 so as to hold them relative to one another. Preferably the retainer 24 includes a wall 26 overlying the race 16. In manufacturing the structure 10 this bearing 14 is located in a mold (not shown) so that the housing 12 can be formed with respect to it in such a manner as to include a first cylinder 28 which is located coaxially with a second cylinder 30 so that these cylinders 28 and 30 have a common interior 32. The first cylinder 28 is preferably formed so as to include an internal annular bead 34 capable of serving as a retainer.

The second cylinder 30 includes an internal cavity 36 located concentrically around the axis of the cylinder 30. This cavity 36 is shaped so as to include a generally outwardly bowed barrel shaped peripheral wall 38 fitting closely against in intimate contact with the retainer 24. The cavity 36 also has a side 40 extending from the wall 38 to its interior 32 and a further side 42 which is located so as to be coplanar with an end 44 of the cylinder 30. These sides 40 and 42 are perpendicular to the common axis of the cylinders 28 and 30; the side 42 in effect places the interior of the cavity 36 in such a manner that it is exposed at the end 44 in order that the ball race 18 is accessible from the exterior of the structure 10.

An important item relative to the manufacture of the structure 10 by molding housing 12 about the bearing 14 lies in the fact that as a result of such molding there is "firm" direct engagement between the peripheral wall 38 and the retainer 24. Further, a polymer such as polypropylene will tend to shrink in cooling from a temperature at which ti will "flow" during molding so as to intimately engage the retainer 24 and so as to exert a force in this retainer 24 which will firmly and securely hold the bearing 14 in place. This force is a result of the internal polymer structure created on cooling to ambient temperature.

The manner in which the structure 10 is used is comparatively simple. During installation normally the cylinder 30 will be inserted into a cylindrical opening 46 within an item 48 such as a furniture leg. Preferably the opening 46 will be of such a dimension that the cylinder 30 will have to be pressed into position as shown so that an end 50 lf the cylinder 30 generally between the cylinder 30 and the cylinder 28 fits against the item 48. Normally friction will be adequate to hold the housing 12 in position as noted. When the structure 10 is in such a position a headed end 52 on a shaft 54 forming a part of a caster 56 will be inserted through the race 18 and the cylinders 28 and 30 until such time that the end 52 engages the bead 34. By the application of pressure this end 52 will be "snapped" past this bead 34 so that futher engagement between the end 52 and the bead 34 will hold the base 58 of a yoke 60 against the ball race 18. In this position arms 62 on the yoke 60 will support an axle 64 so that a wheel 66 forming a part of the caster 56 can be rotated in an established manner about either axis of the axle 64 or about the axis of the shaft 54.

I claim:

1. A caster support structure which comprises:
   a housing and a bearing,
   said housing being a unitary body of a polymer material shaped so as to include first and second axially aligned hollow cylinders located in end to end relationship,
   said first cylinder being of smaller external diameter than said second cylinder,
   said first cylinder havng an internal annular bead extending into the interior thereof,
   said second cylinder having an internal cavity in the end thereof remote from said first cylinder,
   said cavity constituting an enlargement of the interior of said second cylinder symmetrically located about the common axis of said cylinders in communication with the interiors of said cylinders,
   said cavity having sides located perpendicular to the common axis of said cylinders and a barrel shaped peripheral wall located remote from said common axis connecting said sides,
   a first of said sides of said cavity being coplanar with the end of said second cylinder remote from said first cylinder, said first side serving to expose the interior of said cacity within said peripheral wall,
   at least a portion of said peripheral wall remote from said first side being located further from said common axis of said cylinders than the portion of said peripheral wall adjacent to said end of said second cylinder remote from said first cylinder,
   said bearing including two generally ring shaped ball race parts, said parts being located adjacent to one another and each including a groove serving as a portion of a ball race, a series of balls located betwen said parts within said grooves and a retainer located around said parts,
   said retainer fitting relative to said parts so as to hold said parts and said ball relative to one another so that one of said parts is capable of being rotated relative to the other of said parts,
   the exterior of said retainer having an external barrel shape and being in direct intimate contact with said peripheral wall and so that said one of said parts is located adjacent to the end of said second cylinder remote from said first cylinder,
   said retainer serving to hold said parts in parallel planes perpendicular to the common axis of said cylinders in a position in which one of said parts is exposed at the end of said second cylinder remote from said first cylinder.

2. A caster suport structure as claimed in claim 1 wherein:
   said housing is formed of a polypropylene polymer composition,
   the exterior of said retainer and said peripheral wall are barrel shaped,
   said polypropylene polymer composition is in direct, intimate engagement with the exterior of said retainer and applies a force to the exterior of said retainer as a result of the internal structure of said polymer composition, said internal structure of said polymer composition being of a type automatically resulting from cooling of said polypropylene polymer from a temperature at which said polymer composition flows during molding to ambient temperature.

* * * * *